Dec. 5, 1961   W. P. WOOD   3,011,581
MOTOR VEHICLE WITH CAB AHEAD OF ENGINE
Filed Oct. 7, 1957   4 Sheets-Sheet 1

INVENTOR.
William P. Wood
BY
R. F. Barnard
ATTORNEY

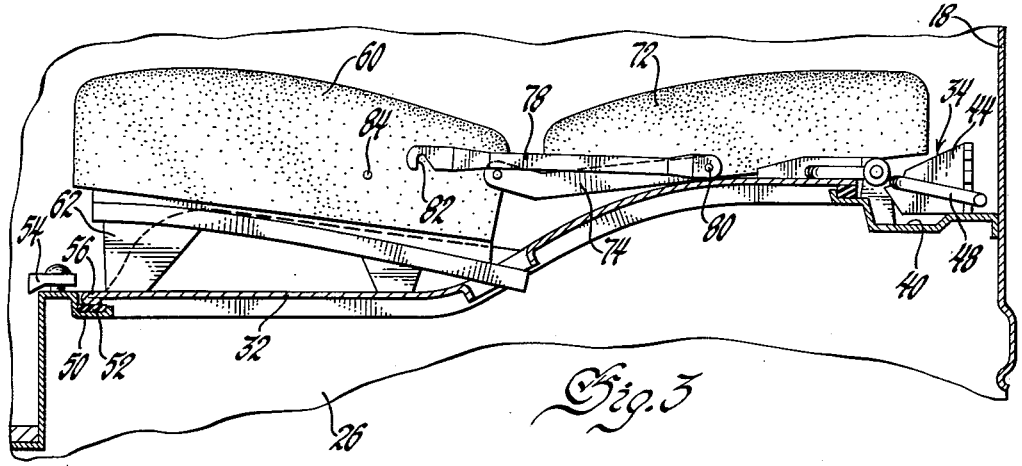

Dec. 5, 1961    W. P. WOOD    3,011,581
MOTOR VEHICLE WITH CAB AHEAD OF ENGINE
Filed Oct. 7, 1957    4 Sheets-Sheet 3

INVENTOR.
William P. Wood
BY
R. R. Barnard
ATTORNEY

Dec. 5, 1961 W. P. WOOD 3,011,581
MOTOR VEHICLE WITH CAB AHEAD OF ENGINE
Filed Oct. 7, 1957 4 Sheets-Sheet 4

INVENTOR.
William P. Wood
BY
R. P. Barnard
ATTORNEY

United States Patent Office 3,011,581
Patented Dec. 5, 1961

3,011,581
MOTOR VEHICLE WITH CAB AHEAD OF ENGINE
William P. Wood, Royal Oak, Mich., assignor to General Motors Corporation, Detroit, Mich., a corporation of Delaware
Filed Oct. 7, 1957, Ser. No. 688,701
8 Claims. (Cl. 180—89)

This invention relates to a vehicle cab construction and, more particularly, to a cab construction for a cab-over-engine vehicle.

Because of their compact structure, cab-over-engine vehicles and particularly trucks have become increasingly popular. In this type of cab construction, the engine is mounted in a compartment rearwardly of and generally below the operator's seat, as well as to some degree over the vehicle front axle. Not only does this shorten the driving connection between the engine and the vehicle wheels, but it also makes possible a shorter overall cab length thereby making a larger pay load possible with a given overall length of cab and chassis.

Cab-over-engine constructions have not, however, been without certain disadvantages heretofore, particularly in that the engine is relatively inaccessible for both repair and adjustment. Attempts have been made to solve this problem by mounting the cab so that it may be tilted forwardly to provide unimpeded access to the engine compartment. Such tilting cab construction, however, is costly and adds weight to the cab construction.

It is therefore a principal object and feature of this invention to provide an improved means of giving unimpeded access to the engine compartment of a cab-over-engine vehicle.

Another object of this invention is directed to the provision of a vehicle seat assembly mounted on a hinged closure for an engine access opening in the floor of the vehicle cab, the seat assembly being collapsible relative to the closure whereby the latter may be hinged upwardly against the rear cab wall without interference therewith by the seat assembly.

In general, these and other objects and features of this invention are attained, according to one embodiment thereof, by providing an opening in the floor of a cab-over-engine type vehicle through which access may be had to an engine compartment disposed beneath the floor, a closure for this opening, and a seat assembly secured to the closure for pivotal movement therewith to expose said compartment, and wherein the seat assembly includes a normally upright back rest which is pivotally connected to the main seat body whereby it may be moved downwardly onto the compartment closure and thereby disposed between the latter and the cab rear wall when the closure is pivoted upwardly for access to the engine compartment.

The aforementioned objects are attained, in general, according to another embodiment of this invention, by providing a novel mounting for the back rest of the seat assembly to the main body thereof, whereby the back rest may be pivoted forwardly and upwardly relative to the main seat body as the latter is pivoted upwardly and rearwardly with the aforementioned engine compartment closure.

A more complete understanding of the aforementioned constructions may be had from the following description in which reference is made to the drawings in which:

FIGURE 3 is a view corresponding to FIGURE 2, but with the seat assembly disposed in a position prior to lifting the engine compartment closure;

FIGURE 4 is a view corresponding to FIGURE 3, with the engine compartment closure lifted;

Figure 1:
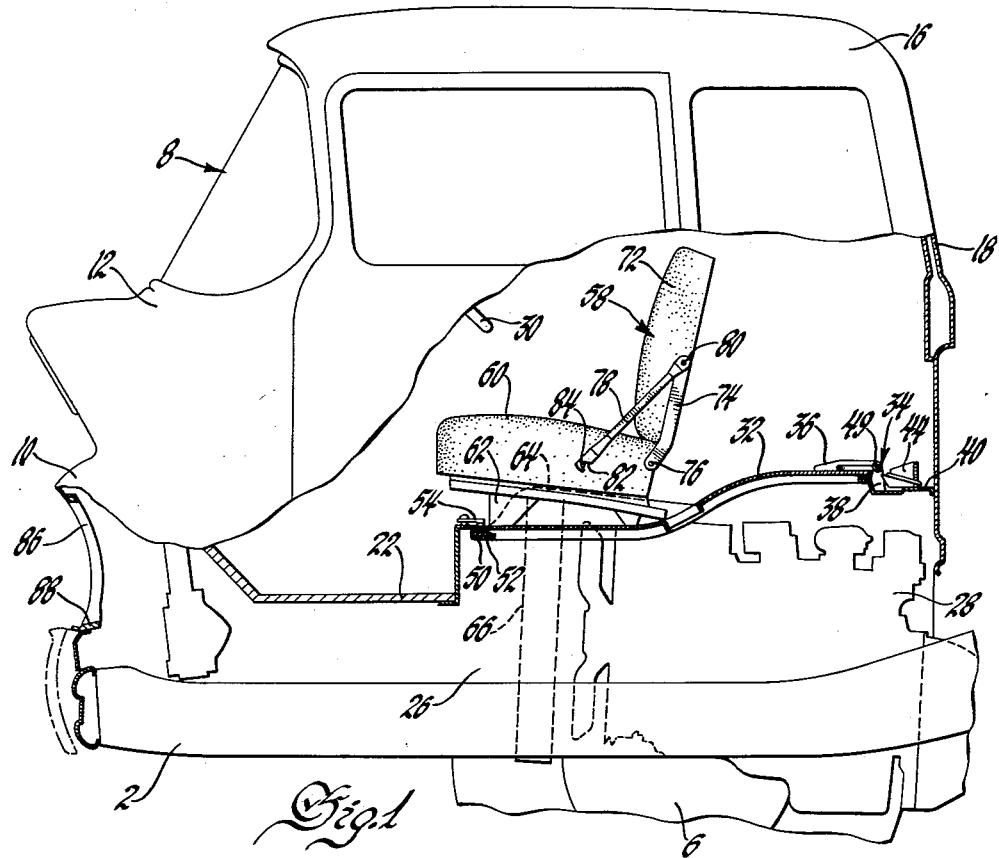
FIGURE 1 is a side elevational view of the forward portion of a truck incorporating the cab-over-engine construction of this invention, with a seat shown in the normal position when occupied by the vehicle operator.

Referring now more particularly to the drawings, and specifically to FIGURES 1 through 4 inclusive showing one form of the invention, there is depicted a truck or other heavy vehicle having a main chassis comprising laterally spaced forwardly extending side rails 2 supporting a front axle having ground engaging wheels 6 mounted thereon. A cab, shown generally at 8, is disposed over and substantially forward of the front axle and wheels 6. The cab 8 includes a front panel 10 extending transversely of the forward extremities of the side rails 2, a cowl 12, roof 16, rear wall 18 in which the window 20 is positioned in a well known manner, and a floor 22 extending between the usual side panels and the aforementioned front panel and rear wall of the cab.

Beneath the floor of the cab, there is an engine compartment 26 extending forwardly from the rear wall 18 toward the front cab panel 10 and between the laterally spaced side rails 2. In the lower rear portion of the compartment, there is an engine 28 having the forward portion thereof mounted over the vehicle front axle. The engine, of course, is suitably suspended from the main truck chassis. A steering wheel 30 is suitably connected through a steering column for steering the forward vehicle wheels 6, and extends rearwardly from the usual instrument panel (not shown).

An opening is formed in the rear portion of the cab floor 22 between the side walls thereof and adjacent the rear wall 18, and is adapted to be closed by a cover 32 which is pivotally connected to the cab floor by a hinge construction shown generally at 34. As shown more specifically in FIGURE 6, it is desirable to provide a hinge of the torque bar variety which includes laterally spaced hinge straps 36 bolted or otherwise rigidly secured to the trailing edge of the engine compartment cover 32, and straps 38 similarly secured to the rear edge 40 of the cab floor and pivotally connected on a hinge axis 42 to the hinge straps 36. Laterally spaced brackets 44 are disposed on the rear portion 40 of the cab floor and include a plurality of notches 46 adapted to receive and lock the rearwardly curved portions 48 of a pair of torsion bars or rods 49 which extend transversely of the vehicle in opposite directions from these brackets for connection with the hinge strap 36 opposite thereto. As shown clearly in FIGURE 6, this connection includes a substantially U-shaped terminal portion of each torsion bar or rod which is fitted through a suitable aperture in the hinge straps 36, and which is supported in the hinge axis 42.

Figure 2:
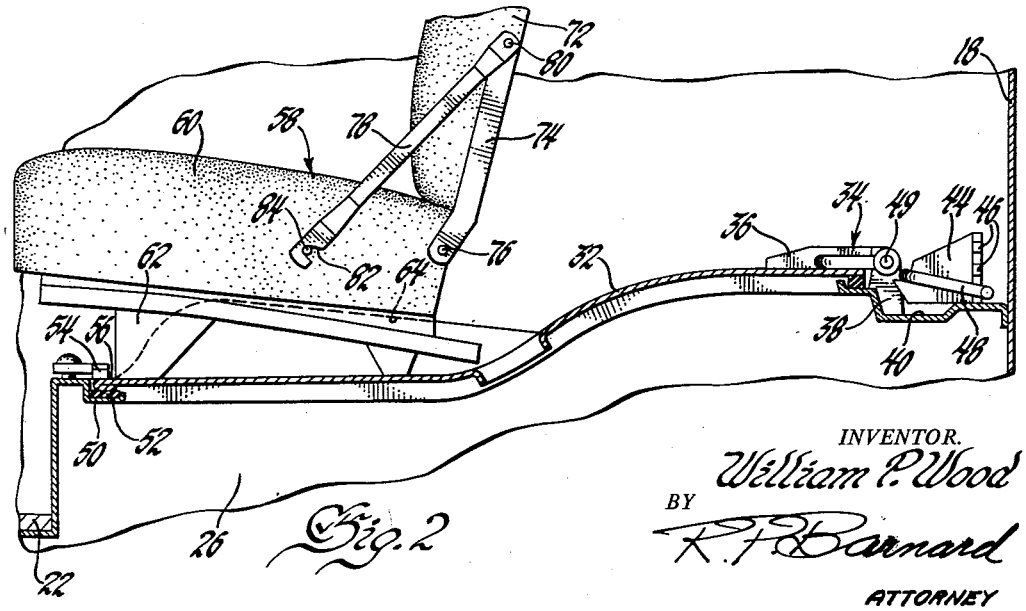
FIGURE 2 is an enlarged fragmentary view showing certain portions of the underlying structure of the engine compartment closure and seat assembly of FIGURE 1.

The peripheral flange 50 of the cab floor 22 which defines the access opening therethrough may be suitably provided with a gasket means 52 against which the cover may rest when in the closed position as shown in FIGURES 1 through 3 inclusive, suitable latch means such as the pivotally mounted latch arm 54 being provided to ride over the forward edge 56 of the cover to detachably retain the latter in the closed position.

A seat assembly 58 is mounted over and secured to the closure or cover member 32 for pivotal movement with the latter about its hinge. This seat assembly includes a main body or load bearing portion 60, including a seat cushion, secured to a suitable base 62 bolted or otherwise rigidly secured to the lateral extremities of the cover 32 to either side of a central raised portion 64 of the latter which provides clearance for the radiator 66 and other associated parts of the engine 28. A back rest 72 including a suitable cushion is carried by a pair of laterally spaced support arms 74 each of which is pivotally connected at 76 to the rear edge of the main load bearing portion 60 of the seat assembly. The back rest is adapted to be maintained in a normal substantially upright position by a pair of struts 78 each of which have their upper ends pivotally connected at 80 to the back rest, while their lowermost ends are notched at 82 for reception of a pin 84 fixedly secured to the main seat body.

It is preferable that suitable means be provided for mounting the seat portion 60 on the seat base 62 whereby the entire seat assembly may be adjusted fore and aft with respect to the cover 32 and steering wheel 30. Although a particular type of adjusting means has not been shown, such means are relatively well known in the art and usually comprise longitudinally extending rails carried by the movable seat portion and disposed through roller bearing elements on fixed rails of the seat base. Suitable spring and latching means are provided in such an adjustable seat structure whereby the main body portion thereof may be adjustably fixed in any one of a number of positions fore and aft of the cab.

It will now be appreciated that the seat construction will be disposed as shown in FIGURES 1 and 2 in the normal situation in which it is to be occupied by the vehicle operator. Moreover, the forward edge of the main load bearing portion of the seat may be adjusted fore and aft to the driver's convenience. If it becomes necessary to have access through the cab opening into the engine compartment 26, the seat is first adjusted rearwardly to a sufficient extent as necessary to permit the forward edge of the main load bearing seat portion 60 to pass the steering wheel 30 as the cover is raised. Thereafter, the struts 78 are disconnected from the pins 84 and the back rest is pivoted downwardly until it rests on the rearmost portion of the engine compartment cover between the main load bearing portion of the seat and the cab rear wall 18 as shown in FIGURE 3. At this time, the latch 54 may be disengaged to permit the cover to be swung upwardly and rearwardly to the position shown in FIGURE 4 for access to the engine compartment. Thus, in permitting easy access to the engine compartment, the seat assembly is literally collapsed relative to the engine compartment cover 32 which is then lifted to a position adjacent the cab rear wall 18 as assisted by the torsion bar hinge assembly 34.

It will be noted from FIGURE 1 that the engine compartment 26 extends forwardly completely to the front panel 10, and that the forward portion thereof in front of the engine 28 is a substantially vacant space. It has been found desirable, therefore, to utilize this space for mounting additional engine or vehicle accessories as required and desired. To this end, and to further enhance the accessibility to the engine compartment for the replacement and repair of such accessories or various portions of the engine 28, a transversely extending grille 86 of the usual type is hingedly secured at its lower edge 88 in an opening formed in the front cab panel 10. Thus, by hinging the grille downwardly as shown by dotted lines in FIGURE 1, another convenient avenue of approach to the engine compartment is provided.

Figure 5:
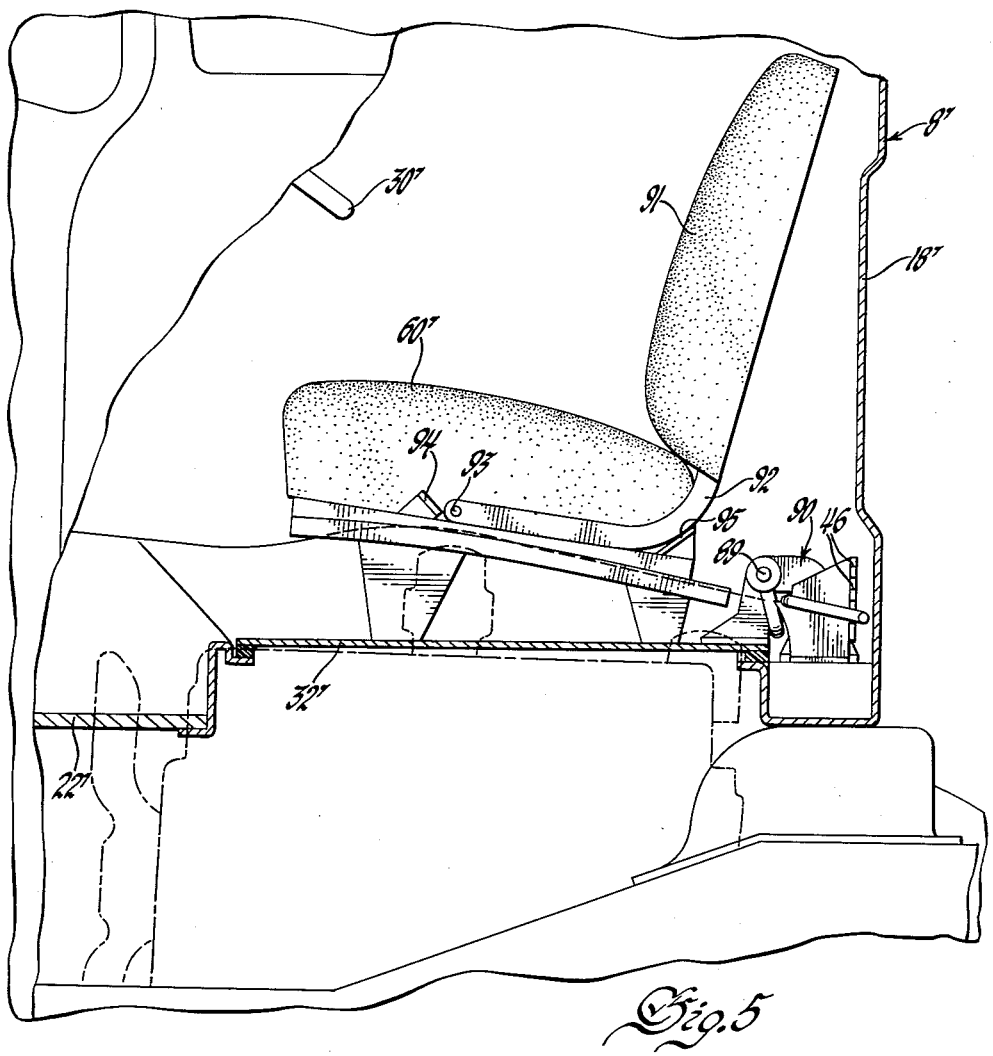
FIGURE 5 is a fragmentary side elevational view of another form of a cab for a cab-over-engine truck construction in which the seat is shown in its normal position adapted to be occupied by the vehicle operator.
Figure 6:
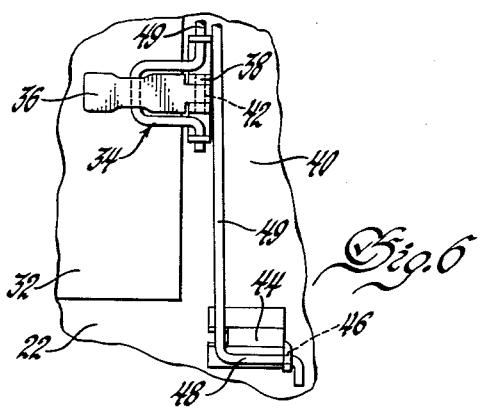
FIGURE 6 is a fragmentary top plan view of a torsion rod hinge assembly which may be utilized with both embodiments of this invention.

In FIGURES 5 and 6 another embodiment of this invention has been shown, primed numerals thereon indicating parts corresponding to those previously described. Again, a closure or cover 32' is provided for the opening in the floor of the cab, and is adapted to be pivotally mounted on the axis 89 of the hinge shown generally at 90. For the sake of simplicity, the aforedescribed torsion bar hinge construction has not been shown in detail with respect to this embodiment, although it will be quite apparent that the torsion bar construction aforedescribed may be, and preferably is, utilized with the hinge construction shown in FIGURES 5 and 6.

In this form of the invention, the main body or load bearing portion 60' of the seat assembly is again secured transversely of the cover 32' for pivotal movement with the latter about its hinge axis. However, the normally upright back rest 91 is secured to a pair of laterally spaced support arms 92 which, in the normal position of use as shown in FIGURE 5, curve gently forwardly for pivotal connection at 93 to the main seat portion. Suitable stop means or plates 94 and 95 are, respectively, carried forward of and to the rear of the pivot axis 93. Thus, in the FIGURE 5 position, abutment of the stop plate 95 with the curved portion of the support arms 92 maintains the back rest in the normal upright position immediately forwardly of the cab rear wall 18'.

Figure 7:
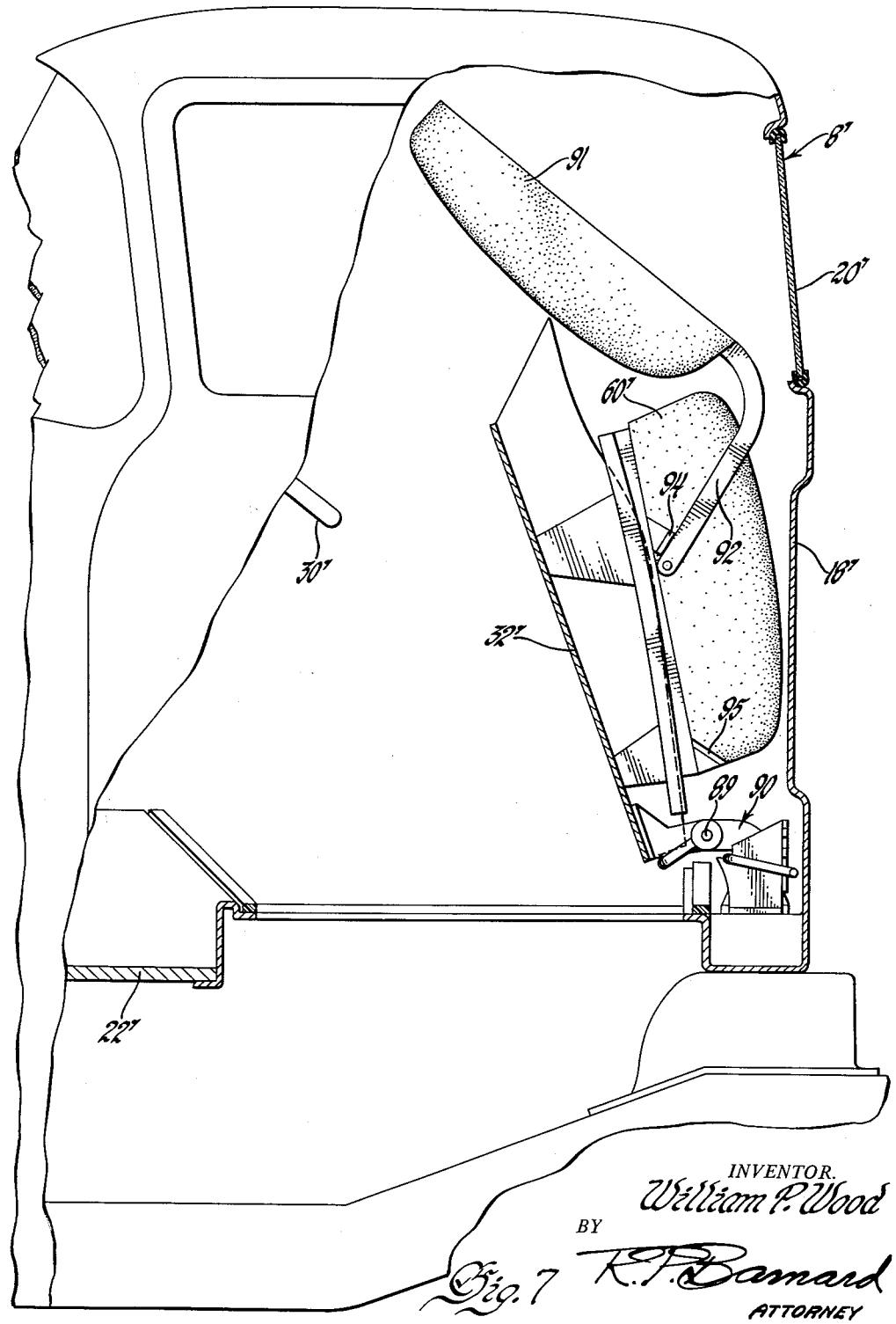
FIGURE 7 is a view corresponding to FIGURE 5 in which the engine compartment closure has been lifted.

If access to the engine compartment is desired, the cover 32' is swung upwardly and rearwardly about the hinge axis 89. It will be appreciated that, prior to swinging the cover up, the back rest may be swung forwardly until it rests against the steering wheel 30' in which position the arms 92 will not have yet engaged the forward stop means 94. Thus, as the cover is swung upwardly, the back rest may pivot forwardly until its support arms abut the stop means 94 as shown in FIGURE 7.

It will therefore be seen that an unusually compact structure results in providing a cab, and particularly the combination of an engine compartment cover and seat assembly therefor, which provides ready access to an engine compartment disposed beneath the vehicle operator's seat. Moreover, the construction shown by this invention has all the advantages of known cab-over-engine designs, while none of the disadvantages resulting from tilting cab constructions such as costliness and additional weight in the cab construction. In the embodiments shown, the seat assembly includes relatively collapsible members which may be disposed so as not to interfere with the rear wall of the cab in swinging the engine compartment cover upwardly and rearwardly toward the rear cab wall. With respect to the embodiment shown in FIGURE 5, it will be noted that an extremely short cab construction results by reason of the fact that in its normal position the seat assembly may be disposed immediately forwardly of the cab rear wall.

Having shown two embodiments of the invention, it is to be understood that they are for illustrative purposes only and are not intended to limit the scope of the invention which is defined by the claims which follow.

What is claimed is:

1. A vehicle comprising a cab including a floor and rear wall, an engine compartment beneath said floor, said floor having an opening providing access to said compartment, a closure for said opening pivotally hinged to said floor adjacent said rear wall, a seat assembly mounted on said closure, said assembly comprising a main load bearing portion forwardly of the cab rear wall and mounted over and secured to said closure for pivotal movement therewith, a back rest, means pivotally connecting said back rest to said load bearing portion adjacent the rear edge thereof, means carried by said back rest and detachably connectable to said load bearing portion to retain said assembly in a normal load bearing disposition in which said back rest is substantially upright relative to said load bearing portion, said means being detachable to pivot said back rest downwardly into the space between said load bearing portion and cab rear wall and into a plane substantially parallel to the plane of said closure.

2. A vehicle comprising a driver's cab including a floor and rear wall, an engine compartment beneath said floor, said floor having an opening providing access to said compartment, a closure for said opening pivotally hinged to said floor adjacent said rear wall, a seat assembly mounted on said closure, said assembly comprising a main load bearing portion forwardly of the cab rear wall and mounted over and secured to said closure for pivotal movement therewith, a back rest, means pivotally connecting said back rest to said load bearing portion adjacent the rear edge thereof, strut means carried by said back rest and detachably connectable to said load bearing portion to retain said assembly in a normal load bearing disposition in which said back rest is substantially upright relative to said load bearing portion, said strut means being detachable to pivot said back rest downwardly into the space between said load bearing portion and cab rear wall and into a plane substantially parallel to the plane of said closure.

3. A vehicle comprising a driver's cab including a floor and rear wall, an engine compartment beneath said floor, said floor having an opening providing access to said compartment, a closure for said opening pivotally hinged to said floor adjacent said rear wall, latch means for detachably retaining said closure over said opening, a seat assembly mounted on said closure, said assembly comprising a main load bearing portion mounted over and secured to said closure for pivotal movement therewith, a back rest pivotally connected to said load bearing portion adjacent the rear edge thereof, strut means carried by said back rest and detachably connectable to said load bearing portion to retain said assembly in a normal load bearing disposition in which said back rest is substantially upright relative to said load bearing portion, said strut means being detachable to pivot said back rest downwardly against said closure between said load bearing portion and said cab rear wall.

4. A vehicle comprising a cab including a floor and rear wall, an engine compartment beneath said floor, said floor having an opening extending forwardly from said rear wall to provide access to said compartment, a closure for said opening, torque bar hinge means pivotally connecting said closure to said floor adjacent said rear wall, latch means for detachably retaining said closure over said opening, a seat assembly mounted on said closure, said assembly comprising a horizontal main load bearing portion secured over said closure for pivotal movement therewith and spaced forwardly from said cab rear wall, a back rest pivotally connected to said load bearing portion adjacent the rear edge thereof, means carried by said back rest and detachably connectable to said load bearing portion to retain said assembly in normal load bearing disposition in which said back rest extends substantially upright relative to said horizontal load bearing portion, said last-named means being detachable to pivot said back rest downwardly against said closure between said load bearing portion and said cab rear wall.

5. A vehicle comprising a cab including a floor and rear wall, an engine compartment beneath said floor, said floor having an opening extending forwardly from said rear wall to provide access to said compartment, a closure for said opening, hinge means pivotally connecting said closure to said floor adjacent said rear wall, a seat assembly mounted on said closure, said assembly comprising a main load bearing portion secured to said closure for pivotal movement therewith, a back rest disposable in a substantially upright position at the rear edge of said load bearing portion and immediately forward of said cab rear wall with said assembly in a normal position, support arms carried by said back rest and pivotally connected to said load bearing portion, stop means engageable with said support arms to either side of the pivotal connection of the latter to said load bearing portion, the rearmost stop means cooperating with said support arms to retain said back rest in the normal upright position, and the forwardmost stop means cooperating with said support arms to limit forward pivoting movement of said back rest as said closure is pivoted upwardly and rearwardly about its hinge toward said rear wall.

6. A vehicle comprising a cab including a floor and rear wall, an engine compartment beneath said floor, said floor having an opening extending forwardly from said rear wall to provide access to said compartment, a closure for said opening, hinge means pivotally connecting said closure to said floor adjacent said rear wall, latch means for detachably retaining said closure over said opening, a seat assembly mounted on said closure, said assembly comprising a substantially horizontal main load bearing portion secured to said closure for pivotal movement therewith, a back rest disposable in a substantially upright position at the rear edge of said load bearing portion and immediately forward to said cab rear wall with said assembly in a normal position, forwardly extending support arms carried by said back rest and pivotally connected to said load bearing portion, stop means carried by said load bearing portion to either side of the pivotal connection thereto of said support arms for engagement with the latter, the rearmost stop means cooperating with said support arms to retain said back rest in the normal upright position, and the forwardmost stop means cooperating with said support arms to limit forward pivoting movement of said back rest as said closure is pivoted upwardly and rearwardly about its hinge toward said rear wall.

7. A vehicle comprising a cab including a floor and rear wall, an engine compartment beneath said floor, said floor having an opening extending forwardly from said rear wall to provide access to said compartment, a closure for said opening, hinge means pivotally connecting said closure to said floor adjacent said rear wall, a seat assembly mounted on said closure, said assembly comprising a main load bearing portion mounted over and secured to said closure for pivotal movement therewith, a back rest, means pivotally connecting said back rest to said load bearing portion, said back rest being pivotal substantially into the plane of and immediately beyond one edge of said load bearing portion to dispose said seat assembly between said rear wall and said closure when the latter is pivoted upwardly toward said rear wall to expose said compartment through said opening.

8. A vehicle comprising a cab including a floor and rear wall, an engine compartment beneath said floor, said floor having an opening extending forwardly from said rear wall to provide access to said compartment, a closure for said opening, torque bar hinge means pivotally connecting said closure to said floor adjacent said rear wall, latch means for detachably retaining said closure over said opening, a seat assembly mounted on said closure, said assembly comprising a main load bearing portion mounted over and secured to said closure for pivotal movement therewith, a back rest, means pivotally connecting said back rest to said load bearing portion, said back rest being normally disposed in a substantially upright position relative to said load bearing portion and being pivotal substantially into the plane of and immediately beyond one edge of said load bearing portion to dispose said seat assembly between said rear wall and closure when the latter is pivoted upwardly toward said rear wall to expose said compartment through said opening, whereby said back rest does not interfere with said cab rear wall.

References Cited in the file of this patent

UNITED STATES PATENTS

| | | |
|---|---|---|
| 1,344,546 | McGuire | June 22, 1920 |
| 1,631,131 | Hoeldtke | June 7, 1927 |
| 2,064,100 | Bachman | Dec. 15, 1936 |
| 2,104,335 | Stahl | Jan. 4, 1938 |
| 2,154,011 | Reinoehl et al. | Apr. 11, 1939 |
| 2,582,687 | Fisher | Jan. 15, 1952 |
| 2,857,977 | Bock | Oct. 28, 1958 |

FOREIGN PATENTS

| | | |
|---|---|---|
| 725,301 | Great Britain | Mar. 2, 1955 |
| 273,583 | Switzerland | May 16, 1951 |